UNITED STATES PATENT OFFICE.

ERNEST A. WILDMAN, OF NEW YORK, N. Y., AND LAMBERT THORP, OF DETROIT, MICHIGAN, ASSIGNORS TO PARKE, DAVIS & COMPANY, OF DETROIT, MICHIGAN, A CORPORATION OF MICHIGAN.

ANESTHETIC BODIES.

1,193,650. Specification of Letters Patent. Patented Aug. 8, 1916.

No Drawing. Application filed April 17, 1916. Serial No. 91,826.

*To all whom it may concern:*

Be it known that we, ERNEST A. WILDMAN and LAMBERT THORP, both citizens of the United States of America, residing at New York, in the county and State of New York, and Detroit, in the county of Wayne and State of Michigan, respectively, have invented certain new and useful Improvements in Anesthetic Bodies, of which the following is a specification.

The invention relates to the manufacture of synthetic bodies having anesthetic properties resembling cocain, and more particularly to a new series,—viz. alkamin esters of anisic acid. We have found that the alkamin esters of anisic acid may be obtained by the reaction of alkamins with anisoyl chlorid. The compounds thus obtained, hitherto unknown, are valuable for medicinal purposes as local anesthetics, and may be represented by the formula:

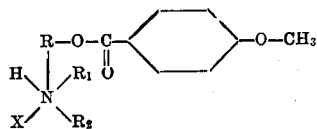

in which R is any bivalent radical of the type:

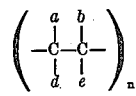

where C is the carbon atom, $a$, $b$, $d$ and $e$ are atoms or radicals such as hydrogen, alkyl, aryl or alkaryl. $n$ stands for the number of carbon atoms in the chain. $R_1$ and $R_2$ are hydrogen atoms or alkyl, or alkaryl radicals which may be alike or different. X is a halogen atom.

The alkamin esters of anisic acid are colorless compounds, oils or low-melting solids, slightly soluble in water, readily soluble in alcohol, ether or benzene, and of alkaline reaction to litmus. The said esters form salts readily soluble in water. On heating with acids or alkalis the alkamin esters of anisic acid are decomposed with formation of an alkamin and anisic acid. A specific body belonging to this series is the anisic acid of gamma-diethylamino propyl alcohol, which may be prepared as follows: Thirteen parts, by weight, of gamma-diethylamino propyl alcohol are dissolved in eighty parts, by weight, of acetone, and to this solution seventeen parts, by weight, of anisoyl chlorid are gradually added. The solution is cooled and then treated with an equal volume of ether. After standing a sufficient time the white, crystalline precipitate, namely, the hydrochlorid of the gamma-diethylamino propyl ester of anisic acid, is filtered and recrystallized from a mixture of acetone and ether. Its melting-point is 129° centigrade, and it is readily soluble in water. When to an aqueous solution of the aforesaid hydrochlorid potassium carbonate is added, the free base, namely, the gamma-diethylamino propyl ester of anisic acid, is precipitated as a colorless oil. In an analogous or different manner other alkamin esters of anisic acid may be obtained.

What we claim as our invention is:—

1. As new products, the alkamin esters of anisic acid, being colorless compounds, oils or low-melting solids, slightly soluble in water, readily soluble in alcohol, ether or benzene, of alkaline reaction to litmus, decomposed when heated with acids or alkalis, with formation of an alkamin and anisic acid, forming salts soluble in water, which solution produces local anesthesia.

2. As a new product, the alkamin ester gamma-diethylamino propyl ester of anisic acid, being a colorless oil slightly soluble in water, readily soluble in alcohol, ether or benzene, of alkaline reaction to litmus, decomposed when heated with hydrochloric acid or sodium hydroxid, with formation of gamma-diethylamino propyl alcohol and anisic acid, forming a salt with hydrochloric acid which crystallizes from a mixture of acetone and ether in the form of snow-white crystals melting at 129° centigrade, an aqueous solution of which is of anesthetic action.

In testimony whereof we have hereunto affixed our signatures.

ERNEST A. WILDMAN.
LAMBERT THORP.